(No Model.)
J. BENSON.
COMPOUND TOOL.
No. 390,433. Patented Oct. 2, 1888.
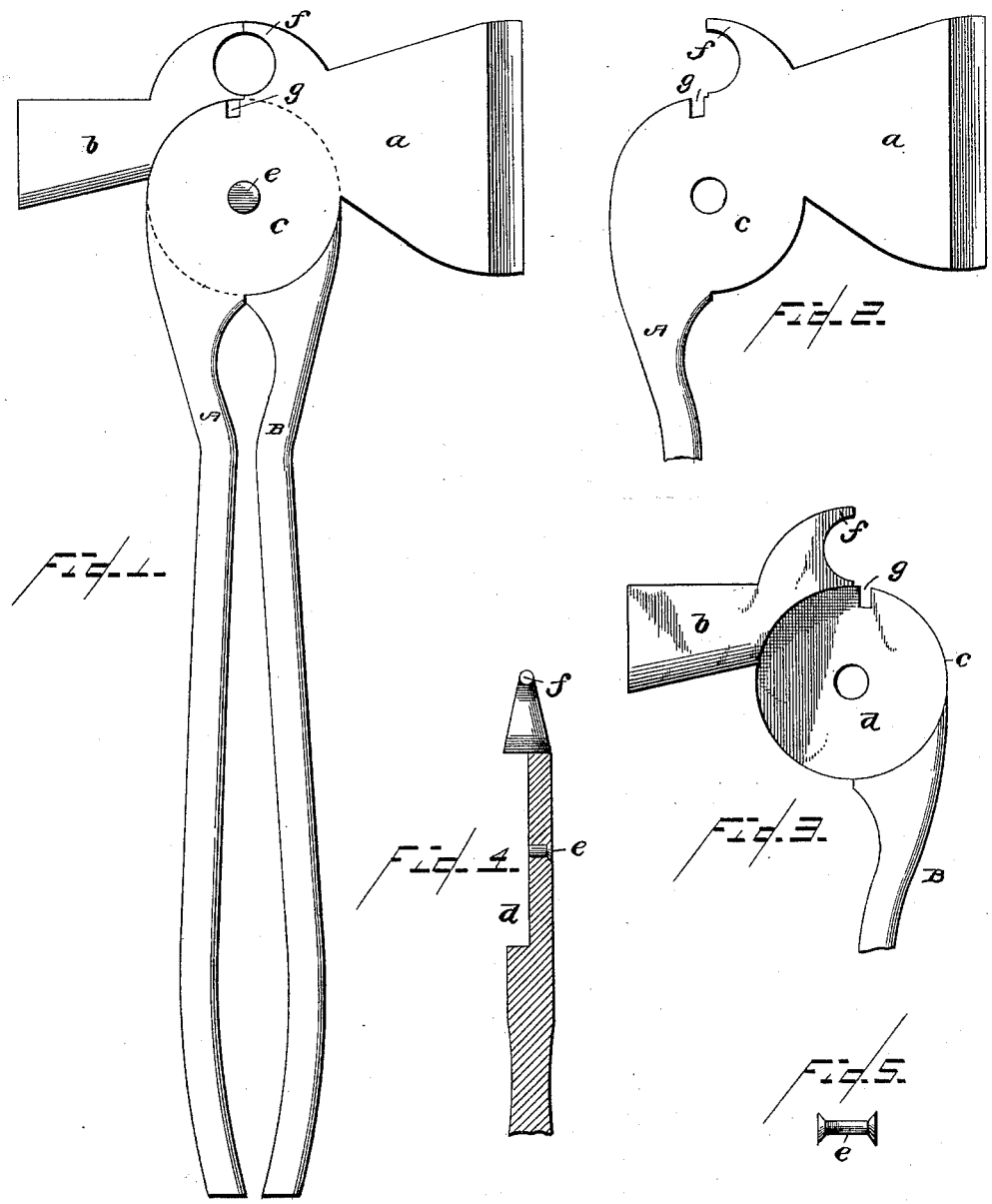
WITNESSES
James Benson,
INVENTOR
By James J. Sheehy
Attorney

UNITED STATES PATENT OFFICE.

JAMES BENSON, OF TASCOSA, TEXAS.

COMPOUND TOOL.

SPECIFICATION forming part of Letters Patent No. 390,433, dated October 2, 1888.

Application filed March 29, 1888. Serial No. 268,896. (No model.)

*To all whom it may concern:*

Be it known that I, JAMES BENSON, a citizen of the United States, residing at Tascosa, in the county of Oldham and State of Texas, have invented certain new and useful Improvements in a Compound Tool; and I do declare the following to be a full, clear, and exact description of the invention, such as will enable others skilled in the art to which it appertains to make and use the same.

This invention relates to a compound tool; and it has for its object to provide a hammer, hatchet, staple-puller, and wire cutter in a single implement.

The invention will be fully understood from the following description and claim, when taken in connection with the annexed drawings, in which—

Figure 1 is a front view of an implement embodying my improvements. Fig. 2 is a view of a portion of one of the levers carrying the hatchet and a portion of the staple-puller and cutter. Fig. 3 is a similar view of a portion of one of the levers carrying the hammer and a portion of the staple-puller and cutter. Fig. 4 is a longitudinal section of Fig. 3, and Fig. 5 is a view of the rivet for uniting the two levers.

Referring by letter to the said drawings, A B indicate two levers, one of which is provided with a blade, $a$, similar to that of the ordinary hatchet-blade, and the other is provided with a head or enlargement, $b$, similar to that of the ordinary hammer-head. It will thus be seen that the implement, when viewed in elevation, will present in outline the appearance of an ordinary hatchet having its handle divided into two branches. These two levers are enlarged at their forward ends, as shown at $c$, and are correspondingly recessed on their engaging faces, as shown at $d$, where they are centrally perforated and united by a pivot, bolt, or rivet, $e$. The outer ends of these levers are recessed and tapered to form curved tapering jaws $f$, so as to receive a staple between them, thus affording an effective means of extracting the staple. At the base of these tapering extensions, which form the extracting jaws of the staples, I provide notches $g$, arranged in such a manner that when the two levers A B have been sufficiently moved apart the said notches will coincide to receive the wire to be cut. It will thus be seen that as the levers are closed the notches will move across each other, thereby severing the wire placed therein, giving the said wire a shear cut.

This device may be very cheaply manufactured, being but little more expensive than the ordinary hatchet, and while it may be used for every purpose to which the hatchet is adapted it will be found a very useful implement in the building and repairing of wire fences.

I am aware that it is not new to form an implement formed of two pivoted levers, one carrying a blade and the other a hammer and both extending to form jaws to serve as nail-extractors.

Having described my invention, what I claim is—

The compound implement herein described, consisting, essentially, of the lever A, having a cutter, $a$, a recessed and centrally-perforated enlargement, $c$, a notch, $g$, at the outer end of the said enlargement, and a curved and tapering jaw, $f$, and a lever, B, similarly enlarged and recessed, as at $c$ $d$, and centrally perforated, and having a head, $b$, a notch, $g$, and a curved and tapering jaw, $f$, and the rivet $e$, for uniting the two levers at the recessed enlargement, substantially as specified.

In testimony whereof I affix my signature in presence of two witnesses.

JAMES BENSON.

Witnesses:
H. H. WALLACE,
A. D. TOMB.